United States Patent
Tsuihiji et al.

(10) Patent No.: US 8,948,573 B2
(45) Date of Patent: Feb. 3, 2015

(54) IMAGE PROCESSING APPARATUS

(71) Applicant: Canon Kabushiki Kaisha, Tokyo (JP)

(72) Inventors: Yuki Tsuihiji, Kawasaki (JP); Tetsuya Hada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 13/691,355

(22) Filed: Nov. 30, 2012

(65) Prior Publication Data

US 2013/0142258 A1     Jun. 6, 2013

(30) Foreign Application Priority Data

Dec. 2, 2011 (JP) ................................ 2011-265065

(51) Int. Cl.
    *H04N 5/761*     (2006.01)
    *H04N 19/50*     (2014.01)
    *G11B 27/034*     (2006.01)
    *G11B 27/32*     (2006.01)

(52) U.S. Cl.
    CPC ........ *H04N 19/00569* (2013.01); *G11B 27/034* (2013.01); *G11B 27/322* (2013.01)
    USPC .......................................... 386/282; 386/239

(58) Field of Classification Search
    None
    See application file for complete search history.

(56) References Cited

U.S. PATENT DOCUMENTS

| | | | |
|---|---|---|---|
| 2003/0184456 A1* | 10/2003 | Hayami et al. | 341/59 |
| 2006/0193211 A1* | 8/2006 | Furuyama | 369/30.32 |
| 2010/0049865 A1* | 2/2010 | Hannuksela et al. | 709/231 |
| 2012/0185570 A1* | 7/2012 | Bouazizi et al. | 709/219 |

FOREIGN PATENT DOCUMENTS

JP     2002-218384 A     8/2002

* cited by examiner

*Primary Examiner* — William C Vaughn, Jr.
*Assistant Examiner* — Eileen Adams
(74) *Attorney, Agent, or Firm* — Canon U.S.A., Inc. IP Division

(57) ABSTRACT

When identification information of an appending start frame coincides with identification information of the final frame of moving image data of an existing moving image file, an image processing apparatus changes the appending start frame to another frame.

18 Claims, 6 Drawing Sheets

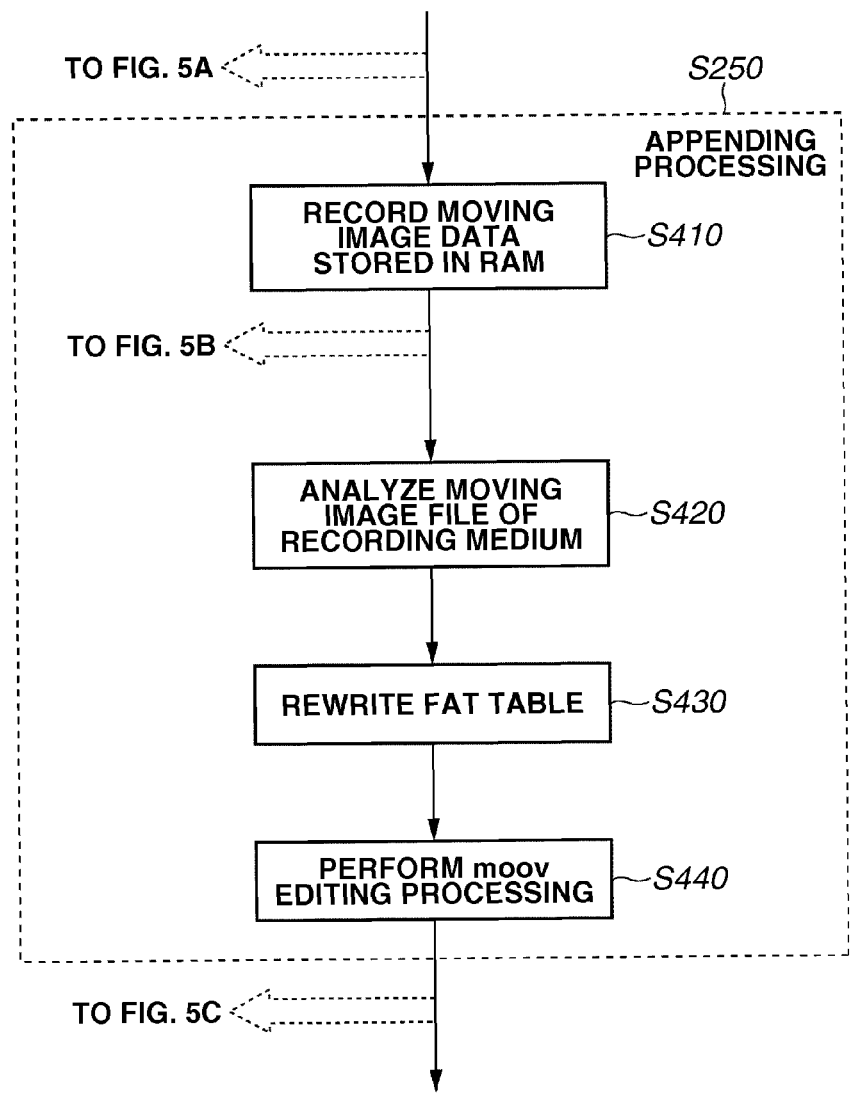

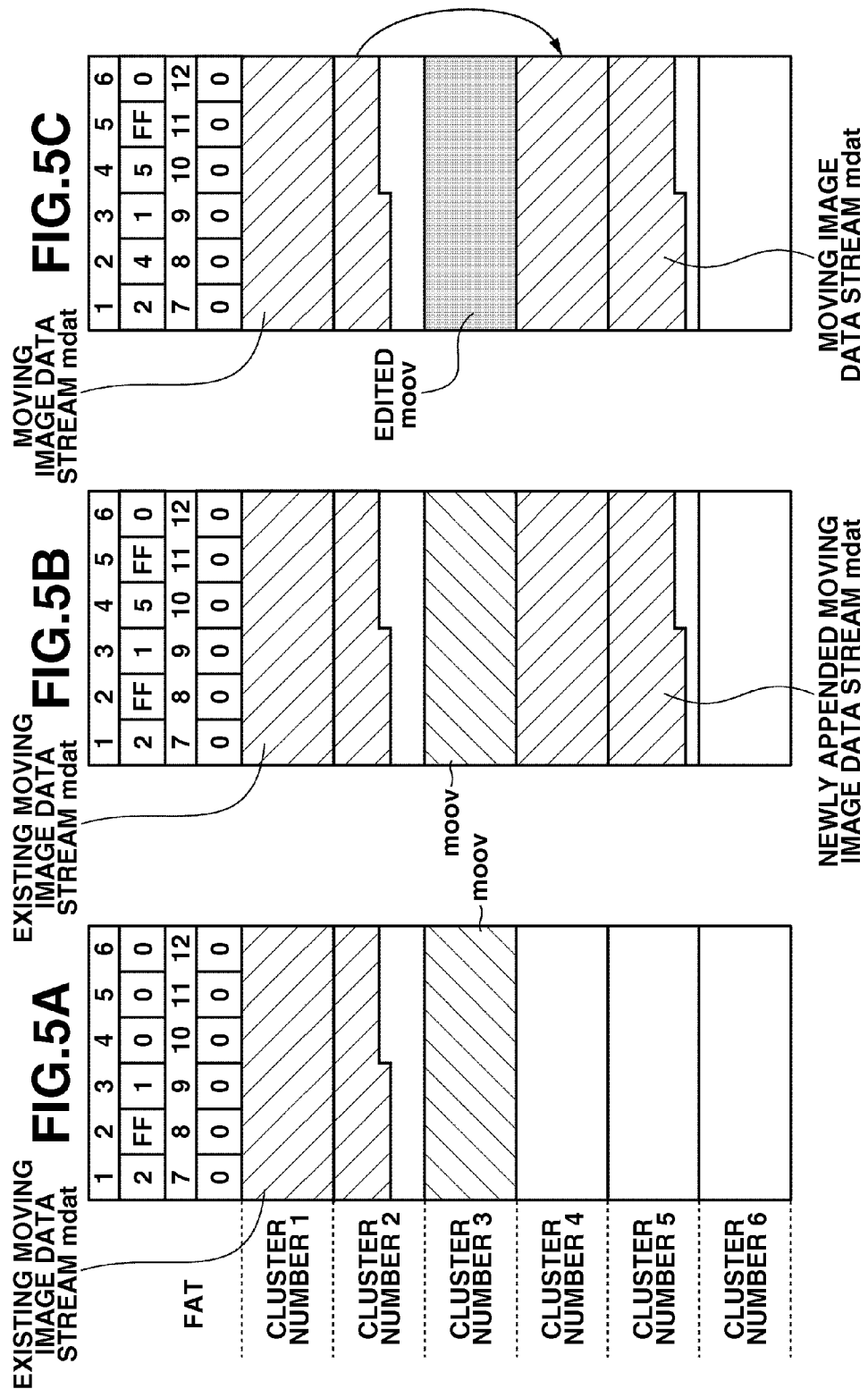

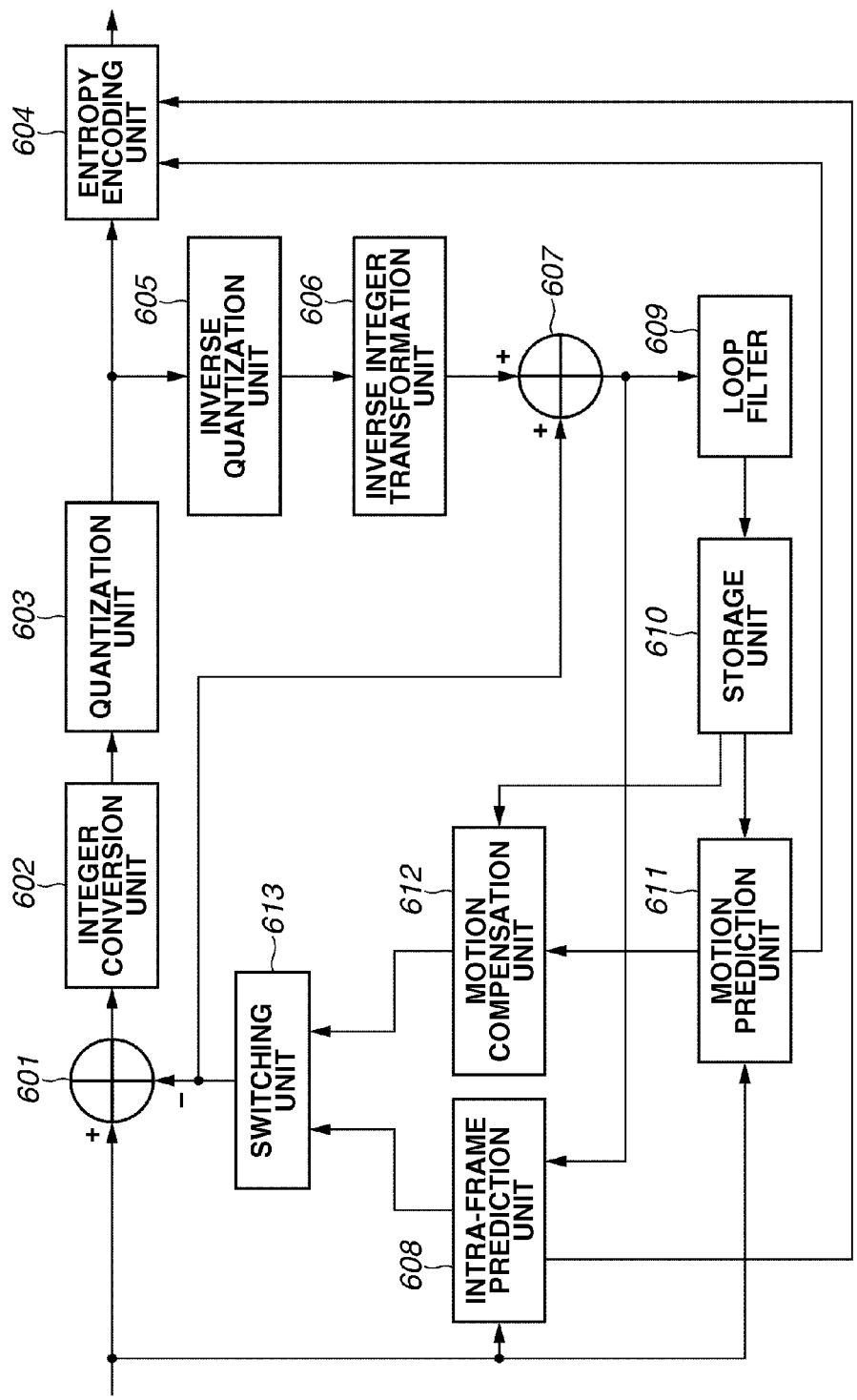

IMAGE PROCESSING APPARATUS

BACKGROUND OF THE INVENTION

1. Field of the Invention

The invention relates to an image processing apparatus. More specifically, the invention relates to an image processing apparatus that can append new moving image data to moving image data of an existing moving image file recorded on a recording medium.

2. Description of the Related Art

As discussed in Japanese Patent Application Laid-Open No. 2002-218384, there is a conventional imaging apparatus that can append moving image data captured in a shooting operation to moving image data of an existing moving image file recorded on a recording medium. The imaging apparatus discussed in "Japanese Patent Application Laid-Open No. 2002-218384" can additionally record newly captured moving image data to the moving image data stored in the existing moving image file recorded on a recording medium.

On the other hand, the MPEG-4 AVC/H.264 standard is known as a recently introduced moving image compression encoding standard. The MPEG-4 AVC/H.264 standard can realize a compression rate that is higher than that of a conventional compression method (e.g., MEPG2), and can be used as a moving image data compression method applicable to an imaging apparatus. In particular, the MPEG-4 AVC/H.264 standard includes a newly defined Instantaneous Decoding Refresh (IDR) frame.

The IDR frame refers to an intra-frame coded frame (hereinafter referred to as "I frame") using information that is contained only within the frame. The MPEG-4 AVC/H.264 standard regulates in such a way that a predicted frame (hereinafter referred to as "P frame") or a bi-directional predicted frame (hereinafter referred to as "B frame") that performs inter-frame coding using a subsequent frame cannot refer to any frame that precedes the IDR frame.

Further, according to the MPEG-4 AVC/H.264 standard, IDR frame identification ID (idr_pic_id) is assigned to each IDR frame although the same IDR frame identification ID (idr_pic_id) cannot be allocated to each of neighboring IDR frames (see ISO/IEC14496-10).

If connection of moving image data based on the MPEG-4 AVC/H.264 compression encoding standard is performed using the technique discussed in "Japanese Patent Application Laid-Open No. 2002-218384", the following problem may arise. That is, the IDR frame identification ID (idr_pic_id) of the last frame of the moving image data stored in the existing moving image file recorded on the recording medium happens to be identical to the IDR frame identification ID (idr_pic_id) of the first frame of newly captured moving image data.

SUMMARY OF THE INVENTION

The present invention is directed to an image processing apparatus capable of generating moving image data by connecting moving image data using a compression method accompanied by the above-described constraint that "the IDR frame identification ID (idr_pic_id) to be allocated to each of neighboring IDR frames must be different from each other" while fulfilling the above-described constraint.

According to an aspect of the present invention, an image processing apparatus includes an acquisition unit configured to acquire an image signal, a compression unit configured to compress the image signal acquired by the acquisition unit as moving image data and assign identification information to each frame of compressed image data, a recording unit configured to append the moving image data compressed by the compression unit to moving_image_data_included_in_a_moving_image_file_already_recorded on a recording medium according to a recording instruction, and a controller configured to determine a frame other than a specific frame compressed by the compression unit predetermined number of frames before the input timing of the recording instruction as an appending start frame and control the recording unit in such a way as to append moving image data of the appending start frame to the moving_image_data_included_in_the_already_recorded_moving_image_file, if identification information of a frame, of the moving image data compressed by the compression unit, having been compressed by the compression unit the predetermined number of frames before the input timing of the recording instruction coincides with identification information of the final frame of the moving_image_data_included_in_the_already_recorded_moving_image_file.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an example of appending processing according to an exemplary embodiment of the present invention.

FIGS. 5A, 5B, and 5C illustrate example states of a moving image file.

FIG. 6 illustrates a configuration of an encoding and decoding processing unit according to an exemplary embodiment of the present invention.

DESCRIPTION OF THE EMBODIMENTS

Figure 1:
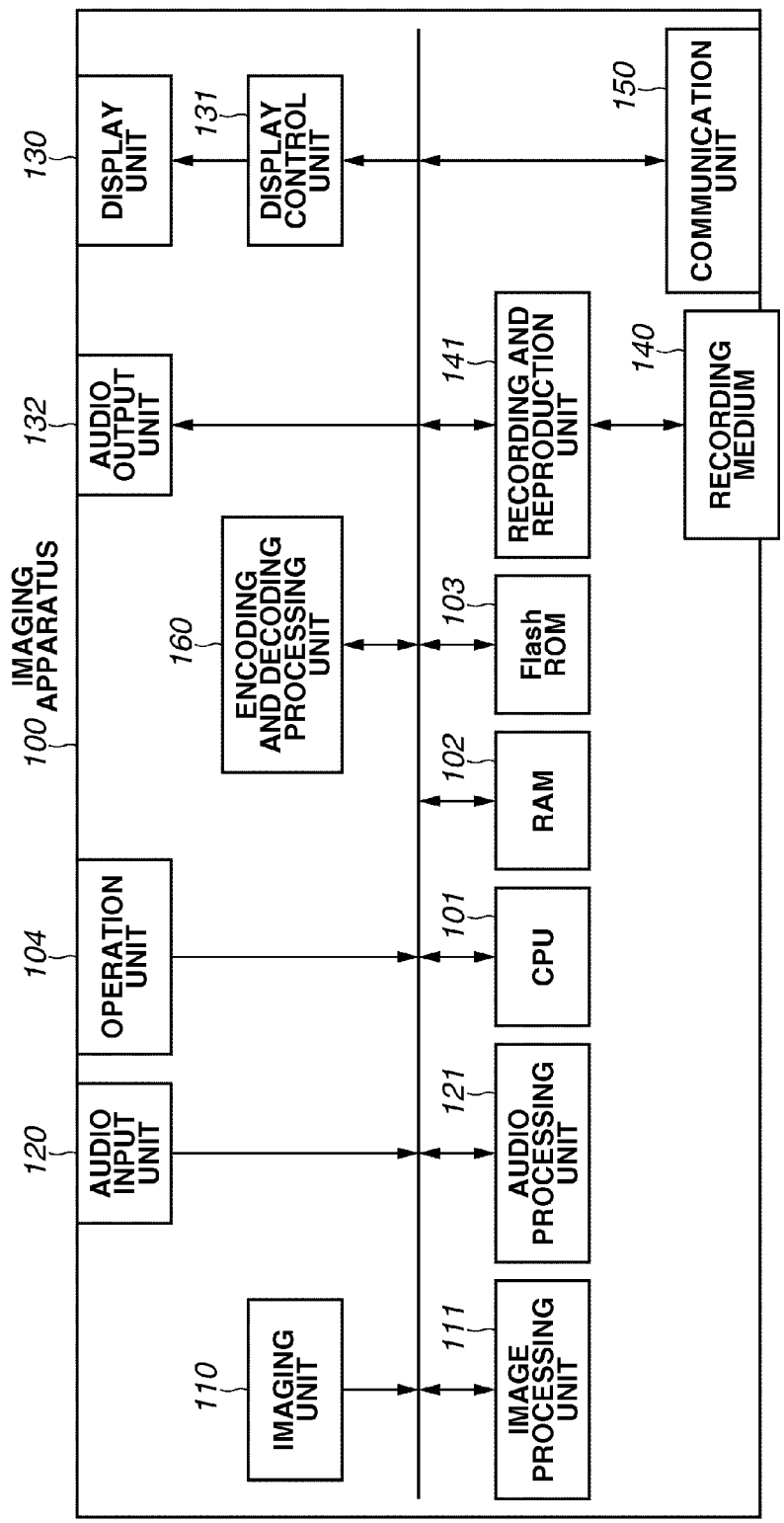
FIG. 1 is a block diagram illustrating a configuration of an imaging apparatus according to an exemplary embodiment of the present invention.

Various exemplary embodiments, features, and aspects of the invention will be described in detail below with reference to the drawings.

In the present exemplary embodiment, an imaging apparatus that can perform a still image capturing operation during a moving image capturing operation is described in detail below. The imaging apparatus according to the present exemplary embodiment uses the "MPEG-4 AVC/H.264" standard as an example moving image data compression method. However, any other compression method is usable if it is comparable to the compression method accompanied by the constraint that "the IDR frame identification ID (idr_pic_id) to be allocated to each of neighboring IDR frames must be different from each other." More specifically, the compression method is not limited to the "MPEG-4 AVC/H.264" standard.

The term "IDR frame" refers to an intra-frame (I) coded frame using information that is contained only within the frame. The MPEG-4 AVC/H.264 standard regulates in such a way that the P frame or the B frame that performs inter-frame coding using a subsequent frame cannot refer to any frame that precedes the IDR frame.

Further, according to the MPEG-4 AVC/H.264 standard, IDR frame identification ID (idr_pic_id) is assigned to each IDR frame although the same IDR frame identification ID (idr_pic_id) cannot be allocated to each of neighboring IDR frames (see ISO/IEC14496-10).

Further, still image data described below are JPEG compressed data. However, any other compression method is usable if it is appropriate, or it may be unnecessary to perform the compression.

Further, the above-described moving image data and still image data can be recorded on a recording medium that is formatted to use the File Allocation Table (FAT) file system or the exFAT file system and can be managed as an independent file. However, it is needless to say that any other file system is usable if it is appropriate.

In response to a shifting to a "movie digest mode" (i.e., an example of the moving image shooting mode), the imaging apparatus according to the present exemplary embodiment successively performs compression encoding on image data obtained by an imaging unit to obtain the above-described IDR frame and stores the compressed moving image data in the RAM. The RAM constantly stores a predetermined number of frames including at least the latest moving image data. Then, if a still image capturing instruction is input, the imaging apparatus performs a still image capturing operation. At the same time, the imaging apparatus records a predetermined number of latest IDR frames stored in the RAM, as moving image data, on a recording medium.

In this case, except for special occasions, the imaging apparatus according to the present exemplary embodiment can perform recording in such a way as to append the moving image data of the predetermined number of frames stored in the RAM to moving image data of an existing moving image file recorded on the recording medium. The imaging apparatus can delete, from the RAM, some frames that correspond to the predetermined number of latest frames.

As one of characteristic features, the imaging apparatus according to the present exemplary embodiment can prevent the first frame of the moving image data to be appended from becoming identical to the last frame of the moving image data of the existing moving image file recorded on the recording medium in IDR frame identification ID (idr_pic_id), when it operates in the "movie digest mode."

To this end, if the mode shifts to the "movie digest mode", the imaging apparatus counts the number of frames having been successively compression coded as IDR frames. Then, the imaging apparatus obtains information corresponding to the IDR frame identification ID (idr_pic_id) of a frame having been compression coded predetermined number of frames before the input timing of the still image recording instruction and stored in the RAM, with reference to the counted number of frames.

The information corresponding to the IDR frame identification ID (idr_pic_id) of the frame having been compression coded predetermined number of frames before the input timing of the still image recording instruction can be calculated in the following manner. First, the imaging apparatus calculates a frame number of the frame having been compression coded predetermined number of frames before the input timing of the still image recording instruction, based on the counted number of IDR frames.

Then, the imaging apparatus calculates a "remainder" by dividing the frame number of the frame having been compression coded predetermined number of frames before by an IDR frame identification ID (idr_pic_id) assigning interval of the encoding and decoding processing unit. Then, based on the calculated "remainder", the imaging apparatus obtains the IDR frame identification ID (idr_pic_id) of the frame having been compression coded predetermined number of frames before the input timing of the still image recording instruction and stored in the RAM.

In this case, the existing moving image file is a MOV format moving image file that includes a "mdat atom" of stream data and a "moon atom" as information relating to stream data of moving image data. Then, the imaging apparatus records information corresponding to the IDR frame identification ID (idr_pic_id) of the last frame of the moving image data of the existing moving image file in a user data atom "udta atom" of the "moon atom."

Based on the above-described information, the imaging apparatus according to the present exemplary embodiment determines whether the last frame of the moving image data of the existing moving image file recorded on the recording medium is identical to the first frame of the moving image data to be appended in IDR frame identification ID (idr_pic_id).

Then, if no coincidence is confirmed with respect to the IDR frame identification ID (idr_pic_id), the imaging apparatus performs recording of moving image data of the predetermined number of frames stored in the RAM in such a way as to follow the tail of the moving image data of the existing moving image file.

In this case, the leading frame of the moving image data to be appended is a frame having been compression coded predetermined number of frames before the input timing of the still image recording instruction and stored in the RAM.

On the contrary, if coincidence is confirmed with respect to the IDR frame identification ID (idr_pic_id), the imaging apparatus performs appending processing with a leading frame that is different from the frame having been compression coded predetermined number of frames before the input timing of the still image recording instruction and stored in the RAM.

More specifically, the imaging apparatus performs appending processing by designating a frame 15 frames later (newer) or earlier (older) than the frame having been compression coded predetermined number of frames before the input timing of the still image recording instruction and stored in the RAM as a leading frame of the moving image to be appended.

Through the above-described operations, the imaging apparatus according to the present exemplary embodiment can prevent the same IDR frame identification ID (idr_pic_id) from being assigned to each of neighboring IDR frames when the imaging apparatus performs appending processing.

The imaging apparatus according to the present exemplary embodiment stores the appending completed moving image data in the existing moving image file, and records information corresponding to the IDR frame identification ID (idr_pic_id) of the last frame of the appending completed moving image data in the user data atom "udta atom" of the "moov atom." Information corresponding to the IDR frame identification ID (idr_pic_id) of the last frame of the moving image data to be appended is used in this case.

Alternatively, it is useful to record the information corresponding to the IDR frame identification ID (idr_pic_id) of the last frame of the moving image data in a header of the moving image file, instead of the user data atom "udta atom" of the "moov atom."

The imaging apparatus configured to have the above-described features according to the present exemplary embodiment can prevent the last frame of the moving image data of the existing moving image file recorded on a recording medium from becoming identical to the first frame of the moving image data to be appended in IDR frame identification ID (idr_pic_id). More specifically, even when the imaging apparatus according to the present exemplary embodiment connects (appends) moving image data using the compression method accompanied by the constraint that "the IDR frame identification ID (idr_pic_id) to be allocated to each of neighboring IDR frames must be different from each other", the imaging apparatus can generate moving image data while fulfilling the constraint.

The IDR frame identification ID (idr_pic_id) is stored in a slice header of a slice composed of a plurality of macroblocks of the encoded IDR frame and can be assigned in a compression encoding operation.

Hereinafter, an example of the above-described imaging apparatus is described in detail below.

In the present exemplary embodiment, the IDR frame identification ID (idr_pic_id) (i.e., IDR frame identification information) is simply referred to as "IDR_ID."

FIG. 1 is a block diagram illustrating a configuration of an imaging apparatus 100 according to the present exemplary embodiment.

The imaging apparatus 100 includes a central processing unit (CPU) 101, a random access memory (RAM) 102, a flash read only memory (ROM) 103, and an operation unit 104. Further, the imaging apparatus 100 includes an imaging unit 110, an image processing unit 111, an audio input unit 120, an audio processing unit 121, a display unit 130, a display control unit 131, an audio output unit 132, a recording medium 140, a recording and reproduction unit 141, and a communication unit 150. Further, the imaging apparatus 100 includes an encoding and decoding processing unit 160.

In FIG. 1, the CPU 101 loads a control program of the imaging apparatus 100 from the flash ROM 103 into the RAM 102 that serves as a work memory, and controls each block of the imaging apparatus 100. The operation unit 104 includes various operational switches, such as a power button, a recording button, a zoom adjustment button, and an auto focus button, which relate to shooting operations.

Further, the operation unit 104 includes a menu display button, a determination button, cursor keys, a pointing device, and a touch panel. If any one of these keys and buttons or the touch panel is operated, the operation unit 104 transmits an operation signal to the CPU 101.

The imaging unit 110 includes a diaphragm that can control the quantity of light of an optical image of a photographic subject captured though a lens. The imaging unit 110 further includes an image sensor, such as a charge coupled device (CCD) sensor or a complementary metal oxide semiconductor (CMOS) sensor, which can convert the captured optical image into an image signal. The imaging unit 110 converts an obtained analog image signal into a digital image signal and temporarily stores the digital image signal in the RAM 102. The digital image signal stored in the RAM 102 can be later transmitted to the image processing unit 111.

The image processing unit 111 is a microcomputer that can execute the following processing using an installed program. The image processing unit 111 performs image quality adjustment processing to adjust the white balance, color, and brightness of the digital image signal based on setting values having been set by a user or based on setting values automatically determined with reference to image characteristics. The image processing unit 111 causes the RAM 102 to store the processed digital image signal again.

To realize the processing to be performed by the image processing unit 111, the CPU 101 may load a program stored in the flash ROM 103 into the RAM 102 and execute the loaded program to perform the above-described processing.

The audio input unit 120 collects ambient sounds of the imaging apparatus 100 using, for example, a built-in omnidirectional microphone or an external microphone connected via an audio input terminal. The audio input unit 120 converts the acquired analog audio signal into a digital signal and temporarily stores the digital signal in the RAM 102. The digital audio signal stored in the RAM 102 can be later transmitted to the audio processing unit 121.

The audio processing unit 121 is a microcomputer that can execute the following processing using an installed program. In a recording operation, the audio processing unit 121 performs level adjustment processing and noise reduction processing for the digital audio signal stored in the RAM 102, and causes the RAM 102 to store the processed digital audio signal again. Further, if necessary, the audio processing unit 121 performs audio signal compression processing.

A conventionally known general audio compression method (e.g., AC3 or AAC) is usable as an example audio compression method, although it is not relevant to the present invention and, therefore, the description thereof is omitted. Further, in a reproduction operation, the audio processing unit 121 performs compressed audio data decoding processing on an audio file or a moving image file, when the recording and reproduction unit 141 reads the file from the recording medium 140. To realize the processing to be realized by the audio processing unit 121, the CPU 101 may load a program recorded in the flash ROM 103 into the RAM 102 and can execute the loaded program to execute the above-described processing.

Further, the display control unit 131 is a microcomputer that can perform a display control to display an image on the display unit 130. The display control unit 131 performs processing for reading the digital image signal temporarily stored in the RAM 102 and displaying an image on the display unit 130 based on the readout image signal.

Further, the display control unit 131 performs processing for causing the display unit 130 to display an image of image data included in a moving image file or a still image file that can be read by the recording and reproduction unit 141 from the recording medium 140.

The display unit 130 may be a liquid crystal panel or an organic electroluminescence (OEL) panel associated with the imaging apparatus 100 or can be a display apparatus (e.g., a television set, a monitor, or a projector) independent of the imaging apparatus 100.

To realize the processing to be performed by the display control unit 131, the CPU 101 can load a program recorded in the flash ROM 103 into the RAM 102 and execute the loaded program to perform the above-described processing.

The encoding and decoding processing unit 160 is a microcomputer that can execute the following processing using an installed program. In a recording operation, the encoding and decoding processing unit 160 performs image compression processing based on the digital image signal processed by the image processing unit 111 and stored in the RAM 102. The encoding and decoding processing unit 160 temporarily stores generated data (i.e., compressed moving image data or still image data) in the RAM 102.

Further, in a reproduction operation, the encoding and decoding processing unit 160 performs processing for decoding compressed moving image data or still image data of an image file having been read out of the recording medium 140 to extract a digital image signal and storing the extracted digital image signal in the RAM 102. In this case, the CPU 101 may load a program recorded in the flash ROM 103 into the RAM 102 and execute the loaded program to perform the above-described processing.

In the present exemplary embodiment, the encoding and decoding processing unit 160 compresses image data obtained by the imaging unit 110 according to the "MPEG-4 AVC/H.264" standard to generate moving image data. According to the "MPEG-4 AVC/H.264" method, the encoding and decoding processing unit 160 performs compression coding on the input image data using an intra-frame predictive encoding method (i.e., an intra encoding method) or a motion compensation forward predictive inter-frame coding method.

Further, it is feasible to add a flag to a designated one of the frames having been encoded using the intra-frame predictive encoding method to prevent a frame that precedes the designated frame from being referred to by a frame according to the above-described motion compensation forward predictive inter-frame coding method. The above-described flag appended frame is referred to as an IDR frame that has an IDR_ID adding function.

As described in the conventionally known "MPEG-4 AVC/H.264" standard (see ISO/IEC 14496-10), IDR_ID is stored in the slice header of a slice composed of a plurality of macroblocks. Therefore, to confirm the presence of IDR_ID, it is usually necessary to decode the frame having been compression coded as the IDR frame.

The encoding and decoding processing unit 160 according to the present exemplary embodiment can perform compression coding on all frames, as IDR frames, and can add IDR_ID to each frame.

Further, the encoding and decoding processing unit 160 according to the present exemplary embodiment performs IDR_ID encoding processing using a numerical value that varies in the range from 0 to 255. More specifically, in a case where all frames are compression coded as IDR frames, the encoding and decoding processing unit 160 assigns IDR_ID="0" to the first frame and assigns IDR_ID="1" to the second frame.

Further, the encoding and decoding processing unit 160 assigns IDR_ID="255" to the 256th frame and assigns IDR_ID="0" to the 257th frame. More specifically, if the numerical value of IDR_ID has reached the final number, the encoding and decoding processing unit 160 restarts using the above-described sequential numbers from the beginning. Accordingly, in a case where all frames are compression coded as IDR frames, IDR_ID of the n-th frame assigned by the encoding and decoding processing unit 160 has a numerical value that can be obtained by subtracting 1 from the "remainder" obtainable when "n" is divided by 256.

In the present exemplary embodiment, the numerical value of IDR_ID varies in the range from 0 to 255. Alternatively, any other numerical range defined by the MPEG-4 AVC/H.264" standard (see ISO/IEC 14496-10), i.e., somewhere in the range from 0 to 65535, is usable.

Further, if an image signal compression and encoding work is once interrupted, the encoding and decoding processing unit 160 according to the present exemplary embodiment reassigns IDR_ID from the beginning (i.e., "0") when the next image signal is compression coded as an IDR frame.

In the present exemplary embodiment, a frame encoded according to the intra-frame predictive encoding method (i.e., intra encoding method) is referred to as an I frame and a frame encoded according to the motion compensation forward predictive inter-frame coding method is referred to as a P frame.

In the "movie digest mode" described below, all frames of a captured moving image are encoded as I frames and set as IDR frames. Further, in the "moving image shooting mode", a selected one of 15 frames is encoded as I frame and the remaining 14 frames are encoded as P frames. Further, in the "moving image shooting mode", it is also useful to use a B frame because any one of a forward predictive inter-frame compression, a rearward predictive inter-frame compression, and a bi-directional predictive inter-frame compression is selectively usable.

The recording and reproduction unit 141 is a microcomputer that can execute the following processing using an installed program. In a moving image recording operation, the recording and reproduction unit 141 writes the data stored in the RAM 102 (e.g., the compressed moving image data generated by the encoding and decoding processing unit 160 and the audio data generated by the audio processing unit 121) together with shooting date and other various information, as a moving image file, on the recording medium 140.

Further, in a still image recording operation, the recording and reproduction unit 141 records the still image data stored in the ROM 102 together with shooting date and other various information, as a still image file, on the recording medium 140. When the recording and reproduction unit 141 records a moving image file on the recording medium 140, the recording and reproduction unit 141 creates a data stream composed of compressed moving image data and compressed audio data and records the created data stream on the recording medium 140. Further, the recording and reproduction unit 141 records the moving image file on the recording medium after adding a file header in such a way as to comply with a file format (e.g., FAT or exFAT).

Further, in a reproduction operation, the recording and reproduction unit 141 reads out a moving image file or a still image file from the recording medium 140 according to the above-described file format. The CPU 101 extracts the compressed moving image data or the compressed still image data by analyzing the header of the readout moving image file or the readout still image file.

The extracted compressed moving image data and the still image data are stored in the RAM and decoded by the encoding and decoding processing unit 160. To realize the processing to be performed by the recording and reproduction unit 141, the CPU 101 can load a program recorded in the flash ROM 103 into the RAM 102 and execute the loaded program to perform the above-described processing.

Further, the recording medium 140 may be a built-in recording medium of the imaging apparatus 100 or a removable recording medium. For example, the recording medium 140 is a hard disk drive, an optical disk, a magneto-optical disk, a compact disk-readable (CD-R), a digital versatile disk-readable (DVD-R), a magnetic tape, a nonvolatile semiconductor memory, a flash memory, or any other type of recording medium. It is useful that the recording and reproduction unit 141 includes an interface to receive a removable recording medium.

The audio output unit 132 is, for example, a speaker or an audio output terminal (e.g., analog terminal/digital terminal). For example, if it is instructed to output a predetermined digital audio signal recorded in the flash ROM 103 in a case where the audio output unit 132 is a speaker, the CPU 101 converts the digital audio signal into an analog audio signal and the audio output unit 132 outputs sounds based on the converted analog audio signal.

Further, the CPU 101 converts a digital audio signal represented by audio data stored in a moving image file into an analog audio signal, and the audio output unit 132 outputs sounds based on the converted analog audio signal. Further, in a case where the audio output unit 132 is an audio output terminal, the CPU 101 converts a digital audio signal represented by audio data stored in a moving image file into an analog audio signal and outputs the converted analog audio signal to an external apparatus (e.g., an external speaker) or directly outputs the digital audio signal to an external apparatus (e.g., audio components equipped with an optical digital terminal).

The communication unit 150 transmits and receives control signals, moving image files, still image files, and various data to and from an external apparatus (independent of the imaging apparatus 100) using an appropriate (wired or wireless) communication method.

An ordinary operation that can be performed by the imaging apparatus 100 according to the present exemplary embodiment is described in detail below.

If a user operates the power button on the operation unit 104 of the imaging apparatus 100 according to the present exemplary embodiment, the operation unit 104 outputs a startup instruction to the control unit 101. If the control unit 101 receives the startup instruction, the control unit 101 controls a power supply unit (not illustrated) to supply electric power to each block of the imaging apparatus 100.

When the control unit 101 receives electric power, the control unit 101 confirms the mode currently selected by a mode switch of the operation unit 104 (e.g., "still image shooting mode", "movie digest mode", "moving image shooting mode", or "reproduction mode") based on the instruction signal received from the operation unit 104.

The imaging apparatus 100 according to the present exemplary embodiment can compress moving image data using the "MPEG-4 AVC/H.264" standard, in particular, in the "moving image shooting mode" or in the "movie digest mode" as described in detail below.

If the currently selected mode is the "still image shooting mode", the CPU 101 causes each block of the imaging apparatus 100 to perform preparation for a still image capturing operation. If the CPU 101 does not yet receive a shooting start instruction from the operation unit 104, the CPU 101 causes the RAM 102 to store digital image signals obtained by the imaging unit 110, and controls the display control unit 131 in such a way as to read out digital image signals from the RAM 102 and display an image on the display unit 130 based on each readout digital image signal.

Alternatively, the CPU 101 may control the display control unit 131 in such a way as to read out the digital image signal processed by the image processing unit 111 and stored in the RAM 102 and display an image on the display unit 130. In the present exemplary embodiment, the frame rate of each digital image signal output from the imaging unit 110 is 30 frames/sec. Further, in the present exemplary embodiment, the CPU 101 can set a desired size (i.e., number of pixels), which is selectable from a plurality of sizes, for a still image to be recorded.

In this state, the CPU 101 checks the presence of the shooting start instruction input from the operation unit 104. If the presence of the shooting start instruction is confirmed, the CPU 101 adjusts the shutter speed, the diaphragm, and the focus position of the imaging unit 110, and causes the imaging unit 110 to convert an analog image signal obtained by the image sensor in a shutter-opened state into a digital image signal and output the converted digital image signal.

The CPU 101 causes the RAM 102 to store digital image signals obtained by the imaging unit 110, and controls the image processing unit 111 in such a way as to perform image quality adjustment processing on the digital image signals stored in the RAM 102 based on a setting value. Then, the CPU 101 causes the RAM 102 to store the digital image signal processed by the image processing unit 111 and controls the encoding and decoding processing unit 160 in such a way as to encode the digital image signal stored in the RAM 102 to generate still image data.

Next, the CPU 101 causes the RAM 102 again to store the still image data processed by the encoding and decoding processing unit 160, and controls the recording and reproduction unit 141 in such a way as to record the stored still image data as a still image file on the recording medium 140.

If the above-described processing completes, the CPU 101 brings each block back to the preparation state for the still image capturing operation.

Next, if the currently selected mode is the "moving image shooting mode", the CPU 101 causes each block of the imaging apparatus 100 to prepare for a moving image capturing operation. If the CPU 101 does not yet receive a shooting start instruction from the operation unit 104, the CPU 101 causes the RAM 102 to store digital image signals obtained by the imaging unit 110, and controls the display control unit 131 in such a way as to read out digital image signals from the RAM 102 and display an image on the display unit 130 based on each readout digital image signal.

Alternatively, the CPU 101 may control the display control unit 131 in such a way as to read out the digital image signal processed by the image processing unit 111 and stored in the RAM 102 and display an image on the display unit 130. In the present exemplary embodiment, the frame rate of each digital image signal output from the imaging unit 110 is 30 frames/sec.

Further, in the present exemplary embodiment, the CPU 101 can set a desired size (i.e., a desired number of pixels), which is selectable from a plurality of sizes, for a moving image to be recorded. Further, when the imaging apparatus 100 according to the present exemplary embodiment records moving image data on a recording medium, the moving image data to be recorded is a data set of a frame image composed of 15 coded frames and compressed or non-compressed audio data comparable to 0.5 second.

In this state, the CPU 101 checks the presence of the shooting start instruction input from the operation unit 104. If the presence of the shooting start instruction is confirmed, the CPU 101 causes the RAM 102 to store digital image signals obtained by the imaging unit 110, and controls the image processing unit 111 in such a way as to perform image quality adjustment processing on the digital image signals stored in the RAM 102 based on a setting value.

When the CPU 101 continuously performs the moving image capturing operation, the CPU 101 causes the image processing unit 111 to successively process digital image signals output from the imaging unit 110 at the intervals of 30 frames/sec. Then, the CPU 101 causes the RAM 102 to successively store the digital image signals processed by the image processing unit 111.

Next, the CPU 101 controls the encoding and decoding processing unit 160 in such a way as to successively encode a plurality of frames of the digital image signal stored in the RAM 102 to generate moving image data. Then, the CPU 101 causes the RAM 102 to successively store the frame images encoded by the encoding and decoding processing unit 160.

On the other hand, if the presence of the shooting start instruction is confirmed, the CPU 101 controls each block to perform audio related processing. The CPU 101 successively stores digital audio signals received from the audio input unit 120 in the RAM 102, and controls the audio processing unit 121 in such a way as to perform sound quality adjustment processing on the digital audio signals stored in the RAM 102.

Further, if there is an audio compression setting, the CPU 101 controls the audio processing unit 121 in such a way as to compress the audio signals using an appropriate (e.g., AC3 or AAC) audio compression method based on a setting. Then, the CPU 101 causes the RAM 102 to successively store the audio data processed by the audio processing unit 121.

Next, the CPU 101 controls the recording and reproduction unit 141 in such a way as to successively record the moving image data and the audio data stored in the RAM 102 on the recording medium 140. In this case, for example, the CPU 101 forms a data set of encoded image data composed of 15 frames (corresponding to 0.5 second) and audio data comparable to 0.5 second, and adds various necessary information to form a data stream. The CPU 101 controls the recording and reproduction unit 141 in such a way as to record the data stream on the recording medium 140 according to the file system.

Alternatively, it is useful to form a data set of moving image data composed of 30 frames (corresponding to one second) and audio data comparable to one second. The CPU 101 continues the above-described operations until a moving image capturing operation stop instruction is input.

Then, if the image capturing operation stop instruction is input from the operation unit 104, the CPU 101 causes the image processing unit 111 to stop its processing, and causes the encoding and decoding processing unit 160 to stop its encoding processing at the timing when it terminates the encoding of the digital image signal stored in the RAM 102. Then, the CPU 101 controls the recording and reproduction unit 141 in such a way as to stop its operation after the encoded moving image data and the audio data stored in the RAM 102 are thoroughly recorded on the recording medium 140.

If necessary, after completing the recording operation, the CPU 101 can transmit image data of a leading frame, or a plurality of leading frames, of moving image data of a moving image file to the encoding and decoding processing unit 160, and cause the encoding and decoding processing unit 160 to decode the received image data. In this case, the encoding and decoding processing unit 160 may generate thumbnail image data by thinning the number of pixels of the decoded digital image signal and record the generated thumbnail image data in association with the moving image file.

If the above-described processing completes, the CPU 101 brings each block back to the preparation state for the moving image capturing operation.

If the currently selected mode is "reproduction mode", the CPU 101 controls the recording and reproduction unit 141 in such a way as to read out thumbnail image data associated with a designated file (i.e., a moving image file or a still image file) recorded on the recording medium 140. Then, the CPU 101 controls the display control unit 131 in such a way as to display an image including these thumbnail image data on the display unit 130.

Then, if reproducing a file that corresponds to a thumbnail is instructed via the operation unit 104, the CPU 101 controls the recording and reproduction unit 141 in such a way as to read out a designated moving image file or a designated still image file from the recording medium 140. Then, the CPU 101 extracts various information, moving image data, audio data, and still image data from the readout image file, and causes the RAM 102 to store the extracted information and data.

In a case where the imaging apparatus 100 reproduces a still image file, the CPU 101 controls the encoding and decoding processing unit 160 in such a way as to decode the still image data stored in the RAM 102, and causes the RAM 102 to store the decoded digital image signal. Then, the CPU 101 controls the display control unit 131 in such a way as to display an image on the display unit 130 based on the decoded digital image signal stored in the RAM 102.

Further, in a case where the imaging apparatus 100 reproduces a moving image file, the CPU 101 controls the encoding and decoding processing unit 160 in such a way as to decode the moving image data stored in the RAM 102, and causes the RAM 102 to store the decoded digital image signal of each frame. Then, the CPU 101 controls the display control unit 131 in such a way as to successively display an image on the display unit 130 based on the decoded digital image signal of each frame stored in the RAM 102.

Further, in synchronization with the decoding or display timing of a moving image, the CPU 101 transmits corresponding audio data stored in the RAM 102 to the audio output unit 132, and causes the audio output unit 132 to output sounds based on the received audio data. If the audio data is compressed data, the CPU 101 controls the audio processing unit 121 in such a way as to decode the audio data stored in the RAM 102 and transmit the decoded audio data to the audio output unit 132.

Next, if the currently selected mode is the "movie digest mode", the CPU 101 causes the RAM 102 to store digital image signals obtained by the imaging unit 110, and controls the display control unit 131 in such a way as to display an image on the display unit 130 based on the digital image signals read out from the RAM 102.

Alternatively, the CPU 101 may control the display control unit 131 in such a way as to read out the digital image signals processed by the image processing unit 111 from the RAM 102 and display an image on the display unit 130 based on the readout digital image signals. In the present exemplary embodiment, the frame rate of each digital image signal output from the imaging unit 110 is 30 frames/sec. Further, in the present exemplary embodiment, the CPU 101 can set a desired size (i.e., number of pixels), which is selectable from a plurality of sizes, for a moving image to be recorded.

If the currently selected mode is the "movie digest mode", the CPU 101 performs the following control in addition to displaying an image on the display unit 130. The CPU 101 controls the image processing unit 111 in such a way as to perform image quality adjustment processing on the digital image signals stored in the RAM 102 based on a setting value. When the CPU 101 continuously performs the moving image capturing operation, the CPU 101 causes the image processing unit 111 to successively process digital image signals output from the imaging unit 110 at the intervals of 30 frames/sec.

Next, the CPU 101 controls the encoding and decoding processing unit 160 in such a way as to perform compression coding on the digital image signal of each frame having been subjected to the image processing of the image processing unit 111 and store each processed digital image signal as a frame of the moving image data in the RAM 102. Each frame compression coded as moving image data is compression coded as an IDR frame.

In this case, the CPU 101 stores the frame image compression coded as an IDR frame composed of a predetermined number of frames at least in the RAM 102. The frame stored in this case is always the latest IDR frame composed of the predetermined number of frames. Any previous frame image of the IDR frame, if it is stored in the RAM 102, can be deleted.

In the present exemplary embodiment, the CPU 101 stores a frame image comparable to four seconds, which is compression coded as an IDR frame composed of 120 frames (i.e., 30 frames×4 seconds), in the RAM 102.

At the same time, the CPU 101 stores a count value indicating the number of frames having been compression coded by the encoding and decoding processing unit 160 in the RAM 102.

As described above, in a case where the setting mode is the "movie digest mode", the imaging apparatus 100 according to the present exemplary embodiment stores compression coded frame images, as IDR frames composed of a predetermined number of frames, in the RAM 102.

Further, if the mode is set to the "movie digest mode", the CPU 101 controls each block to perform audio related processing. The CPU 101 successively stores the digital audio signal output from the audio input unit 120 into the RAM 102, and controls the audio processing unit 121 in such a way as to perform sound quality adjustment processing on the digital audio signal stored in the RAM 102.

Further, if there is an audio compression setting, the CPU 101 controls the audio processing unit 121 in such a way as to compress the audio signals using an appropriate (e.g., AC3 or AAC) audio compression method based on a setting. Then, the CPU 101 causes the RAM 102 to successively store the audio data processed by the audio processing unit 121.

In this state, if the still image capturing instruction is input from the operation unit 104, the CPU 101 controls the imaging unit 110 in such a way as to stop capturing frame images of moving image data and perform a still image capturing operation. More specifically, the CPU 101 causes the imaging unit 110 to adjust the shutter speed, the diaphragm, and the focus position and causes the imaging unit 110 to convert an analog image signal obtained by the image sensor in a shutter-opened state into a digital image signal and output the converted digital image signal.

The CPU 101 causes the RAM 102 to store digital image signals obtained by the imaging unit 110, and controls the image processing unit 111 in such a way as to perform image quality adjustment processing on the digital image signals stored in the RAM 102 based on a setting value. Then, the CPU 101 causes the RAM 102 to store the digital image signal processed by the image processing unit 111, and controls the encoding and decoding processing unit 160 in such a way as to encode the digital image signal stored in the RAM 102 and generate still image data.

Next, the CPU 101 causes the RAM 102 to store the still image data processed by the encoding and decoding processing unit 160, and controls the recording and reproduction unit 141 in such a way as to record the stored still image data, as a still image file, on the recording medium 140.

If the currently selected mode is the "movie digest mode", the CPU 101 performs the following control in response to an input of the still image capturing instruction from the operation unit 104. The CPU 101 controls the recording and reproduction unit 141 in such a way as to record frame images compression coded as IDR frames (each including a predetermined number of frames), which is stored in the RAM 102, as moving image data, on the recording medium 140.

In this case, the CPU 101 performs appending processing to record the moving image data of the IDR frames stored in the RAM 102 in addition to the moving image data of the existing moving image file recorded on the recording medium 140.

The leading frame of the frames to be appended is basically a frame that has been compression coded by the encoding and decoding processing unit 160 predetermined number of frames before the input timing of the still image recording instruction. In the present exemplary embodiment, the leading frame is a frame having been processed, for example, 120 frames ahead.

More specifically, if the frame number of the frame lastly stored in the RAM 102 is 1500 at the input timing of the still image recording instruction, the CPU 101 designates the 1381st frame as a leading frame and designates the subsequent consecutive 119 frames (i.e., the 1382nd frame to the 1500th frame) as appending target frames.

Although described in detail below, first, the CPU 101 determines whether the moving image data of the existing moving image file recorded on the recording medium 140 is target moving image data to be appended. More specifically, the CPU 101 determines whether to perform appending recording or perform new recording without appending any data.

When the CPU 101 performs appending recording, the CPU 101 calculates the frame number of a frame having been compression coded predetermined number of frames (e.g., 120 frames) before the input timing of the still image recording instruction and stored in the RAM. The CPU 101 obtains IDR_ID relevant information D based on the calculated frame number. Further, the CPU 101 acquires IDR_ID relevant information E of the last frame of the moving image data of the existing moving image file.

Then, the CPU 101 determines whether the IDR_ID relevant information D is identical to the IDR_ID relevant information E. The determination performed by the CPU 101 is to determine whether the appending target moving image data stored in the RAM 102 coincides with the moving image data of the existing moving image file recorded on the recording medium 140, at a connecting portion thereof, with respect to the IDR_ID relevant information.

Then, the CPU 101 performs appending processing if the frame having been compression coded predetermined number of frames before the input timing of the still image recording instruction of the appending target moving image data and stored in the RAM does not coincide with the last frame of the moving image data of the existing moving image file.

On the other hand, if the above-described frames coincide with each other, the CPU 101 deletes 15 frames starting with the frame having been compression coded predetermined number of frames before the input timing of the still image recording instruction of the appending target moving image data and stored in the RAM, and designates the 16th frame as an appending start frame. More specifically, the CPU 101 performs appending recording after setting the appending start frame of the appending target moving image data at the position shifted rearward by 15 frames.

In the present exemplary embodiment, although the CPU 101 deletes leading 15 frames of the appending target moving image data, the total number of frames to be deleted by the CPU 101 can be set to any other value. Alternatively, the CPU 101 can delete none of the frames. More specifically, the CPU 101 can designate a frame following the frame having been compression coded predetermined number of frames before the input timing of the still image recording instruction and stored in the RAM as the appending start frame.

Further, on the contrary, it is feasible to increase the appending target moving image data by 15 frames or by one or more frames. More specifically, the CPU 101 can designate a frame preceding the frame having been compression coded predetermined number of frames before the input timing of the still image recording instruction and stored in the RAM as the appending target frame.

More specifically, the CPU 101 performs the following processing if the frame of the moving image data having been compression coded predetermined number of frames before the input timing of the still image recording instruction and stored in the RAM 102 coincides with the last frame of the moving image data of the existing moving image file. The CPU 101 changes the position of the appending start frame of the appending target moving image data to a frame other than the frame having been compression coded predetermined number of frames before the input timing of the still image recording instruction and stored in the RAM.

The changed position of the appending start frame is, for example, a frame having been compression coded a predetermined number of frames later than, or a frame having been compression coded a predetermined number of frames earlier than, the frame having been compression coded predetermined number of frames before the input timing of the still image recording instruction.

For example, in a case where the IDR_ID relevant information D of the leading frame of the moving image data to be appended is 140, the CPU 101 changes the position of the leading frame to the 154th frame that has been compression coded at later timing or to the 126th frame that has been compression coded at earlier timing.

In a case where the appending target moving image data is increased, the RAM 102 additionally buffers a required number of IDR frames in addition to the ordinarily appended frames.

Through the above-described processing, it is feasible to reduce the possibility that the IDR_ID information of the appending target moving image data coincides with the IDR_ID information of the moving image data of the existing moving image file at the connecting portion thereof.

Then, if the appending recording or the new recording terminates, the CPU 101 stores the IDR_ID relevant information of the final frame of the appending completed moving image data in the user data atom "udta atom" of the "moon atom" of the appending completed moving image file. The IDR_ID of the final frame of the appending completed moving image data is identical to the IDR_ID of the final frame of the appending target moving image data.

Regarding audio data, the CPU 101 controls the recording and reproduction unit 141 in such a way as to record the audio data stored in the RAM 102, as audio data of a moving image file, on the recording medium 140. Then, similar to frame images, the CPU 101 performs appending processing to record the audio data stored in the RAM 102 in addition to the audio data of the existing moving image file recorded on the recording medium 140.

When the CPU 101 records the moving image data and the audio data stored in the RAM 102 on the recording medium 140, the CPU 101 performs the following processing that is similar to that for the ordinary moving image data. More specifically, the CPU 101 forms a data set of encoded image data of 15 frames (corresponding to 0.5 second) and audio data comparable to 0.5 second, and adds various necessary information to the obtained data set to form a data stream. The CPU 101 controls the recording and reproduction unit 141 in such a way as to record the data stream on the recording medium 140 according to the file system. In this case, it is also useful to form a data set of moving image data of 30 frames (corresponding to 1 second) and audio data of one second.

As described above, if the still image capturing instruction is input while in the "movie digest mode", the CPU 101 performs the still image capturing operation, the still image recording operation, and the moving image appending recording operation. Then, if these operations complete, the CPU 101 controls the encoding and decoding processing unit 160 in such a way as to capture frame images of the moving image again and perform compression coding on the captured images, as IDR frames, and then store the compression coded IDR frames in the RAM 102.

In a case where the moving image data of the existing moving image file recorded on the recording medium 140 is not the target moving image data to be appended, the CPU 101 controls the recording and reproduction unit 141 in such a way as to record the moving image data and the audio data, as a new moving image file, on the recording medium 140. In the "movie digest mode", the frame rate and the moving image size are fixed to predetermined values.

An example imaging apparatus operation in the "movie digest mode" according to the present exemplary embodiment is described in detail below with reference to a flowchart illustrated in FIG. 2.

Figure 2:
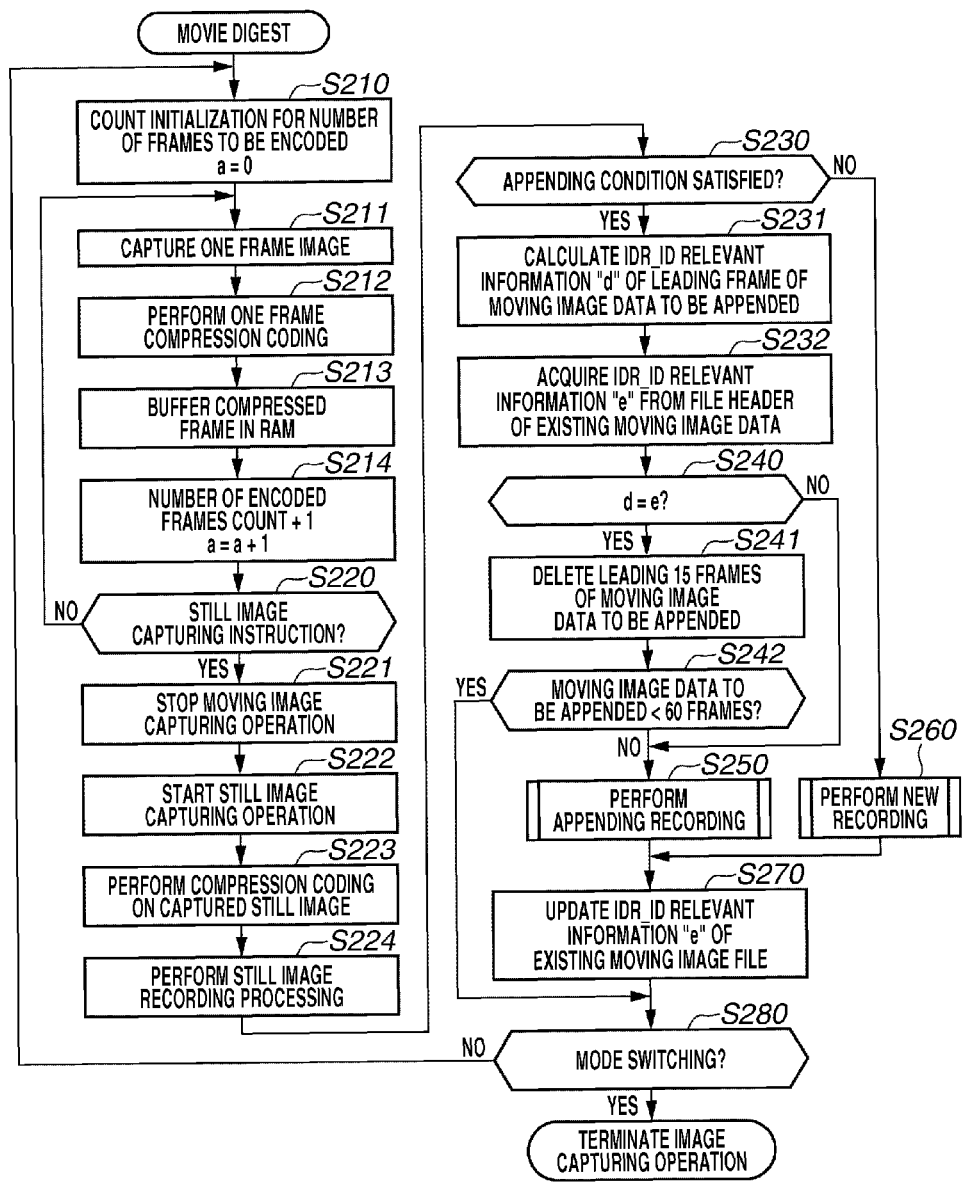
FIG. 2 is a flowchart illustrating an example of movie digest mode processing according to an exemplary embodiment of the present invention.

FIG. 2 is the flowchart illustrating an example operation that can be performed by the imaging apparatus 100 according to the present exemplary embodiment, after the apparatus starts moving image recording in the "movie digest mode" until the apparatus terminates the moving image recording. The processing of the flowchart illustrated in FIG. 2 is an example operation that can be realized when the CPU 101 controls each block of the imaging apparatus 100.

First, in step S210, if an instruction input from the operation unit 104 is switching to the "movie digest mode", the CPU 101 initializes the number of frames A (i.e., a=0), which has been encoded by the encoding and decoding processing unit 160 and stored in the RAM 102.

Next, in step S211, the CPU 101 controls the imaging unit 110 in such a way as to capture an image that corresponds to one frame of the moving image, and controls the image processing unit 111 in such a way as to perform predetermined moving image dedicated image processing on the obtained image.

Next, in step S212, the CPU 101 controls the encoding and decoding processing unit 160 in such a way as to encode a one-frame image signal captured in step S211 as an IDR frame. As described above, in this case, the encoding and decoding processing unit 160 adds "IDRID" to the slice header of the encoded IDR frame. Each time the encoding and decoding processing unit 160 performs encoding to obtain the IDR frame as described above, the encoding and decoding processing unit 160 successively allocates a numerical value as IDR_ID by incrementing the value in the range from "0" to "255."

Next, in step S213, the CPU 101 buffers (i.e., temporarily stores) the IDR frame having been compression coded in step S212 in the RAM 102.

Next, in step S214, the CPU 101 increments the number of frames "a" stored in the RAM 102, which has been encoded by the encoding and decoding processing unit 160, by "1" (i.e., a=a+1).

In the present exemplary embodiment, the RAM 102 stores the compression coded IDR frame together with the number of frames "a" having been encoded by the encoding and decoding processing unit 160. However, the above-described data may be separately stored in different RAMs.

Next, in step S220, the CPU 101 determines whether the still image capturing instruction is input from the operation unit 104. If it is determined that the still image capturing instruction is not input (No in step S220), the CPU 101 repeats the above-described sequential processing in step S211 through step S214. More specifically, until the still image capturing instruction is input, the CPU 101 causes the encoding and decoding processing unit 160 to successively perform compression coding on image signals obtained by the imaging unit 110 and processed by the image processing unit 111 as IDR frames and causes the RAM 102 to successively store the IDR frames. Then, the CPU 101 successively increments the number of compression coded frames "a" stored in the RAM 102.

In the imaging apparatus 100 according to the present exemplary embodiment, the CPU 101 repeats the above-described sequential processing in steps S211 through S214 until the amount of frame images stored in the RAM 102 reaches, for example, 60 frames (corresponding to 2 seconds).

If it is determined that the still image capturing instruction has been input (Yes in step S220), then in step S221, the CPU 101 controls the imaging unit 110 in such a way as to stop the moving image capturing operation. Similarly, the CPU 101 controls the image processing unit 111 in such a way as to stop the moving image dedicated image processing.

Next, in step S222, the CPU 101 starts still image capturing operation based on the still image capturing instruction. More specifically, with reference to still image capturing operation settings, the CPU 101 causes the imaging unit 110 to adjust the shutter speed, the diaphragm, and the focus position. When an analog image signal is obtained by the image sensor in a shutter-opened state, the CPU 101 causes the imaging unit 110 to convert the obtained analog image signal into a digital image signal, and outputs the converted digital image signal. Then, the CPU 101 controls the image processing unit 111 in such a way as to perform still image dedicated image processing on the obtained image signal. Then, the CPU 101 causes the RAM 102 to store the image signal processed by the image processing unit 111.

Next, in step S223, the CPU 101 controls the encoding and decoding processing unit 160 in such a way as to generate still image data, for example, by JPEG compression coding the image signal processed by the image processing unit 111. Next, the CPU 101 causes the RAM 102 to store the still image data processed by the encoding and decoding processing unit 160.

Next, in step S224, the CPU 101 controls the recording and reproduction unit 141 in such a way as to record the still image data stored in the RAM 102, as a still image file, on the recording medium 140.

Next, the CPU 101 performs processing for appending the moving image data of the IDR frame stored in the RAM 102 to the moving image data of the existing moving image file recorded on the recording medium 140.

First, in step S230, the CPU 101 determines whether the moving image data of the existing moving image file recorded on the recording medium 140 is the target moving image data to be appended. More specifically, the CPU 101 determines whether to perform appending recording (Yes in step S230) or perform new recording without appending any data (No in step S230). The condition for not performing the appending recording is described in detail below.

If it is determined that the moving image data of the existing moving image file is the target moving image data to be appended (Yes in step S230), then in step S231, the CPU 101 performs the following processing. The CPU 101 calculates the IDR_ID relevant information D of the leading IDR frame of the moving image data to be appended.

More specifically, first, the CPU 101 reads out the number of frames A that have been encoded by the encoding and decoding processing unit 160 from the RAM 102, and calculates the leading frame number C of the moving image data to be appended with reference to a predetermined number of frames B of the moving image data to be appended. Then, the CPU 101 calculates the IDR_ID relevant information D of the leading frame of the moving image data to be appended based on the leading frame number C and the interval of IDR_ID assigned by the encoding and decoding processing unit 160.

More specifically, the CPU 101 calculates the IDR_ID relevant information D of the IDR frame of the moving image data having been compression coded predetermined number of frames B before the input timing of the still image recording instruction and stored in the RAM 102.

In the present exemplary embodiment, the number of frames A encoded by the encoding and decoding processing unit 160 is identical to the number of frames having been compression coded by the encoding and decoding processing unit 160 after the mode is shifted to the "movie digest mode."

The setting described in the present exemplary embodiment is appending the moving image data of the IDR frame comparable to four seconds, which precedes the input timing of the still image capturing instruction. Therefore, the predetermined number of frames B of the moving image data to be appended is 120 frames (=30 frames/sec×4 seconds). Therefore, the leading frame number C of the moving image data to be appended can be calculated according to the formula "c=a−b."

Further, as described above, the total number of IDR_ID values assigned by the encoding and decoding processing unit 160 is 256 (i.e., 0 to 255). Therefore, the IDR_ID value can be obtained by subtracting 1 from the "remainder" obtainable by dividing the leading frame number C of the moving image data to be appended by 256.

In the present exemplary embodiment, the CPU 101 calculates the IDR_ID relevant information D of the leading frame of the moving image data to be appended by subtracting 1 from the above-described "remainder."

Figure 3A:
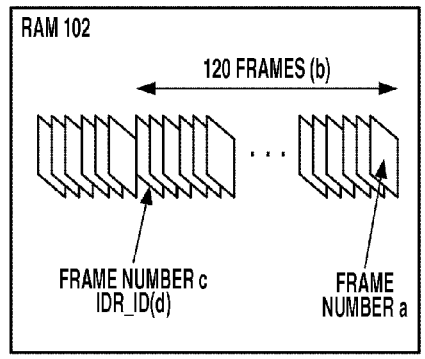
FIGS. 3A, 3B, 3C, 3D, and 3E illustrate example states of moving image data in a movie digest mode shooting operation.

More specifically, as illustrated in FIG. 3A, a plurality of IDR frames is stored in the RAM 102. The leading frame of the moving image data to be appended is a frame having a frame number C, which is older than the input timing of the still image recording instruction by 120 frames (B). The CPU 101 can perform the above-described calculation to obtain the IDR_ID relevant information D of the leading frame of the moving image data to be appended.

For example, if "a" is 1355, then "c" is 1236. Therefore, the CPU 101 can obtain "d" (=211) by subtracting 1 from the "remainder (=212)" obtainable by dividing the obtained value "c" (=1236) by 256.

In a case where the number of IDR frames stored in the RAM 102 is less than 120 frames, the leading frame number of a moving image file to be appended is set to 1 (c=1) and accordingly the IDR_ID relevant information of the leading frame of the moving image data to be appended becomes 0 (d=0).

Figure 3B:
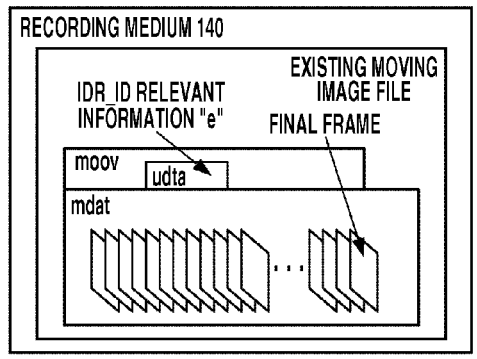

Next, in step S232, the CPU 101 controls the recording and reproduction unit 141 in such a way as to read out the user data atom "udta atom" of the "moon atom" of the existing moving image file, as illustrated in FIG. 3B, and acquire the IDR_ID relevant information E of the final frame of the moving image data of the existing moving image file.

Next, in step S240, the CPU 101 determines whether the IDR_ID relevant information D of the leading frame of the moving image data to be appended is identical to the IDR_ID relevant information E of the last frame of the moving image data of the existing moving image file. In the present exemplary embodiment, the leading frame of the moving image data to be appended is a frame of the moving image data having been compression coded predetermined number of frames B before the input timing of the still image recording instruction and stored in the RAM 102.

If "d" is equal to "e" (Yes in step S240), then in step S241, the CPU 101 deletes leading (i.e., temporally older) 15 frames of the moving image data to be appended from the RAM 102.

As the result of the above-described processing, the leading IDR_ID of the moving image data to be appended becomes either (d+15) or (d−256+15). Thus, it becomes feasible to prevent the moving image data to be appended and the moving image data of the existing moving image file from becoming adjacent to each other in IDR_ID value at the connecting position thereof.

Figure 3C:
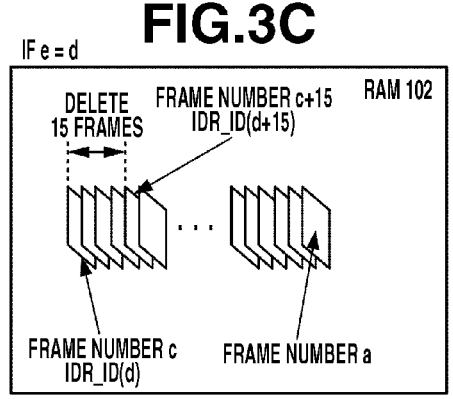

More specifically, as illustrated in FIG. 3C, the CPU 101 deletes 15 frames starting with the leading frame C of the moving image data to be appended, which is stored in the RAM 102, and sets the (c+15)th frame as an appending start frame position.

Although the CPU 101 deletes 15 frames in the present exemplary embodiment, the total number of frames to be deleted can be set to an arbitrary value (e.g., one or two). In the case where the total number of IDR_ID values assignable by the encoding and decoding processing unit 160 is 256, if the number of deleted frames is just equal to 256, an IDR_ID value to be assigned to the leading frame after the deletion processing becomes identical to the IDR_ID value assigned to the leading frame before the deletion processing. In other words, the leading frame after the deletion processing can be any frame if its number is different from multiples of the number used for IDR_ID by the encoding and decoding processing unit 160.

If the appending of the moving image data starting with the leading frame C that can be obtained based on the number of frames A encoded by the encoding and decoding processing unit 160 and the number of frames B of the moving image data to be appended is completed, the frames can be deleted from the RAM 102.

Figure 3D:
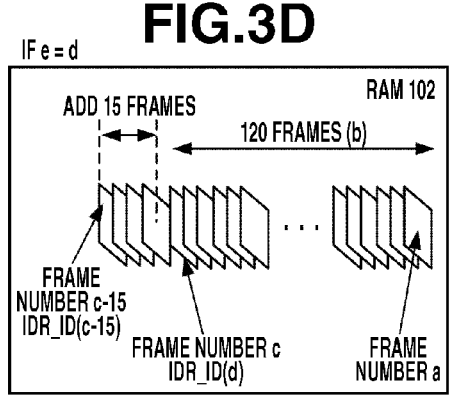

Further, in the present exemplary embodiment, the change of the appending start frame of the moving image data to be appended has been performed in such a way as to shift temporally rearward. Alternatively, it is useful to change the appending start frame in such a way as to shift temporally forward. More specifically, according to the above-described example, it is useful to set the (c−15)th frame as the appending start frame as illustrated in FIG. 3D. In this case, the appending start frame is required to be different from a frame preceding by an interval equivalent to 256 frames, when the intervals of the IDR_ID values usable by the encoding and decoding processing unit 160 is taken into consideration.

More specifically, in the present exemplary embodiment, if the IDR_ID relevant information D of the leading frame of the moving image data to be appended coincides with the IDR_ID relevant information E of the final frame of the existing moving image data, the CPU 101 performs the following processing.

The CPU 101 determines appending target moving image data in such a way as to set the appending start frame to be different from the leading frame of the moving image data to be appended. In the present exemplary embodiment, the leading frame of the moving image data to be appended is a frame of the moving image data having been compression coded predetermined number of frames B before the input timing of the still image recording instruction and stored in the RAM 102.

Next, in step S242, the CPU 101 determines whether the number of frames of the moving image data to be appended is less than 60 frames. If it is determined that the number of frames of the moving image data to be appended is less than 60 frames (Yes in step S242), the CPU 101 skips the following appending processing (see step S250).

The reason why the CPU 101 skips the appending processing is the appending processing may deteriorate the visibility when the size of the moving image data is less than two seconds. Namely, if the number of frames is less than a predetermined number, the CPU 101 does not perform the appending processing.

Figure 3E:
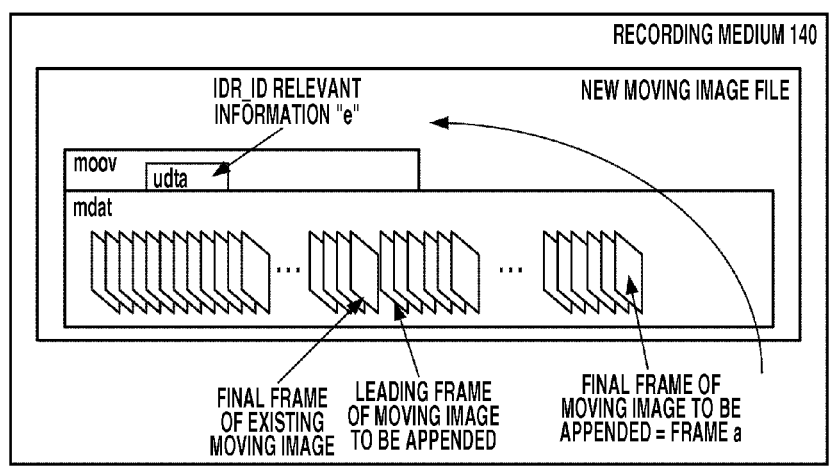

If it is determined that "d" is not equal to "e" (No in step S240), or if it is determined that the number of frames of the moving image data to be appended is not less than 60 frames (No in step S242), then in step S250, the CPU 101 performs appending recording processing. The appending recording processing is described in detail below with reference to FIGS. 4, 5A, 5B, and 5C. The CPU 101 can perform appending in a state where the final frame of the moving image data of the existing moving image file does not coincide with the leading frame of the moving image data to be appended in the IDR_ID value, through the processing in step S241, as illustrated in FIG. 3E.

If it is determined that the moving image data of the existing moving image file is not the target moving image data to be appended (No in step S230), then in step S260, the CPU 101 does not append any moving image data to the moving image data of the existing moving image file.

In this case, the CPU 101 controls the recording and reproduction unit 141 in such a way as to record the moving image data of the IDR frame stored in the RAM 102 on the recording medium 140. Then, the CPU 101 creates information necessary to reproduce the recorded moving image data (e.g., offset information), and controls the recording and reproduction unit 141 in such a way as to record the created information, as the header (or moov atom) of a new moving image file, on the recording medium 140.

If the appending recording processing (see step S250) or the new recording processing (see step S260) terminates, then in step S270, the CPU 101 records the IDR_ID relevant information E of the final frame of the recorded moving image file in the user data atom "udta atom" of the "moov atom" of the recorded moving image file.

In the present exemplary embodiment, the IDR_ID relevant information of the final frame of the moving image data to be appended is the final frame. Therefore, the CPU 101 calculates the IDR_ID relevant information E of the final frame by subtracting 1 from the "remainder" obtainable by dividing the number of frames A encoded by the encoding and decoding processing unit 160 by 256. Then, the CPU 101 records the calculated information as the IDR_ID relevant information E of the final frame of the recorded moving image file in the user data atom "udta atom" of the "moov atom" of the recorded moving image file.

Next, in step S280, the CPU 101 determines whether the operation unit 104 has selected a mode other than the "movie digest mode." If it is determined that the mode has been switched (Yes in step S280), the CPU 101 terminates the "movie digest mode" image capturing operation. If it is determined that the mode has not been switched (No in step S280), the operation returns to step S210, and the CPU 101 restarts the above-described sequential processing.

Through the above-described processing, even when the imaging apparatus 100 according to the present exemplary embodiment connects moving image data using the compression method accompanied by the constraint that "the IDR frame identification ID (idr_pic_id) to be allocated to each of neighboring IDR frames must be different from each other", the imaging apparatus 100 can generate moving image data while fulfilling the constraint.

An example appending processing operation to be performed in step S250 is described in detail below with reference to FIGS. 4, 5A, 5B, and 5C.

FIG. 4 illustrates an imaging apparatus control operation that can be performed when the imaging apparatus 100 performs editing to connect (append) moving image data. FIGS. 5A, 5B, and 5C correspond to respective steps illustrated in FIG. 4, each illustrates a state of a moving image file on the recording medium 140. The processing of the flowchart illustrated in FIG. 4 is an example operation that can be realized when the CPU 101 controls each block of the imaging apparatus 100.

First, in step S410, the CPU 101 controls the recording and reproduction unit 141 in such a way as to record the predetermined time of moving image data, which is stored in the RAM 102 in step S202, on the recording medium 140 that has a free space for the recorded data. The file system used in this case is the FAT file system. Therefore, the CPU 101 records the moving image data in a free cluster according to the basic rule.

FIG. 5A illustrates an example recording state of the existing moving image file prior to the recording of the moving image data of the IDR frame to be appended from the RAM 102 to the recording medium 140. In FIG. 5A, the moving image data of the existing moving image file is recorded in two clusters 1 and 2 and the header of the existing moving image file is recorded in a cluster 3.

As described above, the moving image file is recorded in three clusters 1 to 3. Further, in a FAT area, a FAT entry recording cluster numbers indicates that the files are recorded in order of cluster number 3→1→2.

More specifically, a numerical value "1" is recorded in the FAT entry of the cluster number 3, a numerical value "2" is recorded in the FAT entry of the cluster number 1, and a value "FF" (indicating the file termination) is recorded in the FAT entry of the cluster number 2. Therefore, the data of the existing moving image file can be read out from the recording medium in order of cluster number 3→1→2.

Then, in step S410, the CPU 101 records the moving image data to be appended, which is stored in the RAM 102, on the recording medium 140. FIG. 5B illustrates an example state of the moving image data to be appended, which has been recorded on the recording medium 140. As illustrated in FIG. 5B, the predetermined time of moving image data is recorded in clusters 4 and 5. In this state, as understood from the confirmation of the FAT entry of the FAT area, the moving image data to be appended is recorded in another clusters 4 and 5 that are different from the clusters 1 to 3 in which the existing moving image file is recorded.

Next, example processing to be performed in step S420 is described. In the present exemplary embodiment, if the processing is already started in step S410, the CPU 101 can start the processing in step S420 even in a state where the processing is not yet completed in step S410.

After starting the recording of the moving image data to be appended stored in the RAM 102, the CPU 101 analyzes the moving image data of the existing moving image file recorded on the recording medium 140 and identifies a connecting position thereof.

The connecting position in the present exemplary embodiment is the tail of the moving image data of the existing moving image file. The connecting position identification processing may take a time if the existing moving image file has a larger size because it takes a significant time to read out a file and analyze the readout file.

Next, in step S430, the CPU 101 controls the recording and reproduction unit 141 in such a way as to rewrite the FAT entry to connect (append) the predetermined time of moving image data recorded on the recording medium 140 to the existing moving image file.

More specifically, as illustrated in FIG. 5C, the CPU 101 changes the state where the termination of the existing moving image file is the cluster number 2, and corrects the state by reading the clusters 4 and 5 in such a way as to follow the cluster 2. More specifically, the CPU 101 rewrites the FAT entry of the cluster number 2 of the FAT from "FF" (indicating the file termination) to "4" to read the cluster 4 (i.e., the leading cluster in which new moving image data is recorded).

Then, in step S440, the CPU 101 reads out the moov atom of the existing moving image file and edits the information recorded in the moov atom in such a way as to append information that manages new moving image data, and then records the edited data on the recording medium 140. The information to be recorded in the moov atom is, for example, offset management information that indicates the position of a specific frame of a moving image or a specific GOP start position in the moving image file.

As illustrated in FIG. 5C, the moving image file subjected to the above-described connection editing processing is composed of clusters 1 to 5, which are recorded in order of cluster number 3→1→2→4→5. Through the above-described operations, the CPU 101 completes the appending recording processing.

As understood from the foregoing description, if a shooting instruction is input, the CPU 101 of the imaging apparatus 100 according to the present exemplary embodiment controls the recording and reproduction unit 141 in such a way as to record a predetermined time of moving image data, which has been stored in the RAM 102 prior to the input of the shooting instruction, on the recording medium 140 (see step S410).

Then, after starting the recording of the predetermined time of moving image data stored in the RAM 102, the CPU 101 analyzes the moving image data of the existing moving image file recorded on the recording medium 140 and identifies the connecting position thereof (see step S420). Subsequently, the CPU 101 edits the FAT and the header in such a way as to edit the existing moving image file so that the reproduced predetermined time of moving image data can follow the identified connecting position.

Thus, in a case where newly captured moving image data is connected to the moving image data of the existing moving image file recorded on the recording medium 140, the imaging apparatus according to the present exemplary embodiment records new moving image data temporarily stored in the RAM on the recording medium before analyzing the connecting position of the existing moving image file. Therefore, the moving image data storage area of the RAM 102 can be released.

Therefore, before identifying the connecting position of the existing moving image file, the imaging apparatus according to the present exemplary embodiment can smoothly store the next moving image data in the moving image data storage area of the RAM 102. Accordingly, the time required to capture the next moving image data can be reduced.

A detailed configuration of the encoding and decoding processing unit 160 according to the present exemplary embodiment is described in detail below.

FIG. 6 is a block diagram illustrating example encoding processing that can be performed by the encoding and decoding processing unit 160. In FIG. 6, a digital image signal of a moving image is read out of the RAM 102 and each macroblock composed of a predetermined number of pixels in horizontal and vertical directions is input to a calculation unit 601, an intra-frame prediction unit 608, and a motion prediction unit 611.

The calculation unit 601 calculates a difference between predictive image data having been output from a switching unit 613 and input image data, and outputs the calculated difference to an integer conversion unit 602. The integer conversion unit 602 performs integer conversion processing (i.e., an example of the orthogonal transform) on the data received from the calculation unit 601 to convert the input data from space components to frequency components, and outputs the converted data to a quantization unit 603.

The quantization unit 603 quantizes a conversion coefficient of each macroblock according to a quantization table supplied from a quantization table selection unit 612 and outputs the quantized conversion coefficient to an entropy encoding unit 604 and to an inverse quantization unit 605.

In the present exemplary embodiment, the quantization table selection unit 612 stores a plurality of quantization tables, that allocates a quantization width (i.e., quantization step) for each conversion coefficient of the macroblock. The quantization table selection unit 612 selects a quantization table that corresponds to a compression intensity Q value received from the CPU 101 and sends the selected quantization table to the quantization unit 603, as described below.

The inverse quantization unit 605 inversely quantizes the input data and outputs the inversely quantized data to an inverse integer transformation unit 606. The inverse integer transformation unit 606 performs inverse integer transform processing on the data received from the inverse quantization unit 605 to convert the received data into a data having original space components, and outputs the converted data to a calculation unit 607.

The calculation unit 607 adds the predictive image data received from the switching unit 613 to the inverse integer transform processed data, and outputs the added data to a loop filter 609 in addition to the intra-frame prediction unit 608. The loop filter 609 performs designated filter processing on locally decoded data received from the calculation unit 607, and stores the processed data in a storage unit 610.

The storage unit 610 stores the image data received from the loop filter 609. The motion prediction unit 611 detects a macroblock of image data of a reference frame stored in the storage unit 610, which can minimize a predictive error (i.e., a difference) relative to the input image data, when it processes a P frame in a second compression mode. Further, the motion prediction unit 611 notifies a motion compensation unit 612 of a motion vector that corresponds to the detected macroblock. The motion compensation unit 612 reads macroblock data, as predictive image data, from the storage unit 610 according to the motion vector, and outputs the readout data to the switching unit 613.

On the other hand, the intra-frame prediction unit 608 performs intra-frame predictive processing to process the I frame and the IDR frame in the "movie digest mode" or the "moving image shooting mode." More specifically, the intra-frame prediction unit 608 detects an optimum intra prediction mode based on data of a pixel neighboring on the upper side or the left side of the image data of the macroblock input from the calculation unit 607 on a screen as well as based on the input image data.

Then, the intra-frame prediction unit 608 outputs predictive image data to be processed in the detected intra prediction mode to the switching unit 613. The H.264 technique prepares a predetermined number of intra prediction modes that are mutually different. The intra-frame prediction unit 608 selects one of the above-described prediction modes as a prediction mode capable of minimizing the predictive error.

The switching unit 613 receives the predictive image data from the intra-frame prediction unit 608 or the motion compensation unit 612 according to an instruction from the CPU 101. The switching unit 613 outputs the selected predictive image data to each of the calculation units 601 and 607. In the "movie digest mode", the switching unit 613 constantly selects the predictive image data from the intra-frame prediction unit 608 during a moving image recording operation to constantly compress the image as an IDR frame and output the compressed data.

Further, in the "moving image shooting mode", the switching unit 613 selects the predictive image data from the intra-frame prediction unit 608 when the I frame is processed, and selects the predictive image data from the motion compensation unit 612 when the P frame is processed.

The information indicating the prediction mode detected by the intra-frame prediction unit 608 and the motion vector data detected by the motion prediction unit 611 are output to the entropy encoding unit 604. The entropy encoding unit 604 encodes the data received from the quantization unit 603, the number of the quantization table selected by the quantization table selection unit 612, the prediction mode information, or the motion vector data and outputs the encoded data as compressed moving image data. Further, in this case, the entropy encoding unit 604 adds "IDRID" to the slice header of an assembly of slices composed of macroblocks.

The imaging apparatus 100 according to the present exemplary embodiment basically appends moving image data of the IDR frame stored in the RAM 102 to the moving image data of the existing moving image file, and does not perform the appending operation if the following condition is satisfied (i.e., No in step S230). More specifically, an example condition in step S230 is as follows. In the following description, to simplify the description, the moving image data of the IDR frame stored in the RAM 102 is referred to as "new moving image data."

<If an Appending Target Existing Moving Image File is Protected>

In a case where a specific moving image file "MDG_000X.MOV" recorded on the recording medium 140 is protected, there is a higher possibility that a user does not want to modify the file. Therefore, the appending operation is set to be unfeasible.

<If the File Size Exceeds a Predetermined Size Due to an Appending Shooting Operation>

For example, as described above, the recording medium 140 is managed by the FAT file system. In this case, for example, according to the FAT32 system, it is unable to read a file whose size exceeds 4 GB. Therefore, if the size of the "appending moving image file" exceeds 4 GB in the next shooting operation, the appending operation is set to be unfeasible.

<If an Appending Target Existing Moving Image File is Abnormal in GOP Structure of Moving Image>

As a check result, if it is determined that a specific moving image file "MDG_000X.MOV", i.e., an appending target recorded on the recording medium 140, is abnormal in the GOP structure, there will be an adverse influence on the moving image data to be appended. Therefore, the appending operation is set to be unfeasible.

<If there is not any Appending Target File>

When a moving image is captured in the "movie digest mode", a given file name "MDG_000X.MOV" includes an identifier "MDG" and a 4-digit serial number. However, if there is not any moving image that includes the identifier "MDG" in the file name, it means that the moving image file captured in the "movie digest mode" is not present. Therefore, the appending operation is set to be unfeasible. Further, in a case where a file name of a moving image file lastly recorded in the "movie digest mode" is recorded on a non-volatile memory (not illustrated) of the imaging apparatus 100, the appending operation is set to be unfeasible if there is not any file recorded in the memory.

<If the Shooting Date of an Appending Target Moving Image File is Different from the Setting Date of the Imaging Apparatus>

In a case where successively appending moving image data captured on the same shooting date is set in the "movie digest mode", another moving image file will be recorded according to a change of the date. Therefore, the appending operation is set to be unfeasible.

<If the Region Setting Associated with an Appending Target Moving Image File is Different from the Setting Region of the Imaging Apparatus>

In a case where successively appending moving image data captured in the same region is set in the "movie digest mode", another moving image file will be recorded according to a change of the region. Therefore, the appending operation is set to be unfeasible. For example, a GPS unit capable of obtaining position information is available to acquire the region information. It is also useful to use "country" information, which is selected in the clock setting of the imaging apparatus.

<If the Imaging Apparatus Information Associated with an Appending Target Moving Image File is Different from an Imaging Apparatus that Captures New Moving Image Data>

If it is set to append moving image data captured by the same imaging apparatus in the "movie digest mode", it is confirmed whether identification information of an imaging apparatus associated with an appending target moving image file recorded on a recording medium coincides with an imaging apparatus that performs a shooting operation. Then, if the comparison does not reveal any coincidence, the appending operation is set to be unfeasible.

<If Moving Image Recording Settings are not Identical to Those of the Appending Source Existing Moving Image File>

As described in the present exemplary embodiment, in a case where new moving image data is appended to the existing moving image file, if there is any change in the frame rate, the image size, the GOP configuration, and the moving image encoding method at an intermediate portion of a moving image, it may be difficult to realize seamless reproduction. Therefore, if the moving image data of the existing moving image file is not identical to the new moving image data in moving image recording settings, the appending operation is set to be unfeasible. In this case, the information (e.g., frame rate, image size, GOP configuration, moving image encoding method) is recorded in the file header of the existing moving image file.

<If Audio Recording Settings are not Identical to Those of the Appending Source Existing Moving Image File>

As described in the present exemplary embodiment, in a case where new moving image data is appended to the existing moving image file, if there is any change in the audio sampling rate, the number of channels, the bit depth, and the audio encoding method at an intermediate portion of a moving image, it may be difficult to realize the reproduction. Therefore, if the moving image data of the existing moving image file is not identical to the new moving image data file in audio recording settings, the appending operation is set to be unfeasible. In this case, the information (e.g., audio sampling rate and audio encoding method) is recorded in the file header of the existing moving image file.

<If Insertion/Removal History of the Recording Medium 140 is Present>

When the imaging apparatus 100 is activated, if the insertion/removal history of the recording medium 140 is present in a nonvolatile memory (not illustrated) after lastly capturing an image in a continuous moving image shooting mode, the control unit 101 sets the appending operation to be unfeasible. The above-described setting is effective to reduce the possibility that the moving image file "MDG_000X.MOV" recorded on the recording medium 140 is edited by a computer and the image size is changed or the moving image file itself is damaged due to the appending operation. To this end, the control unit 101 compares shooting date/time information recorded in the file header of the appending target file "MDG_000X.MOV" with the insertion/removal history time information remaining in the nonvolatile memory. The appending moving image file "MDG_000X.MOV" includes a file header that records initially captured time information, of the moving image data of a plurality of scenes recorded in the moving image.

<If the Moving Image Reproduction Time Exceeds a Predetermined Time Due to an Appending Shooting Operation>

In the imaging apparatus 100, considering a case where a shooting operation exceeding a predetermined time (e.g., 30 minutes) is not desired, the appending operation is set to be unfeasible if the reproduction time of the moving image data of the "appending moving image file" exceeds 30 minutes when a new shooting operation is performed in the continuous moving image shooting mode. To this end, for example, if the readout reproduction time of the "appending moving image file" described in the file header is 29 minutes and 58 seconds, the appending operation is set to be unfeasible.

<If the Number of Files in a Folder in which Appending Source Moving Image Files are Recorded is Equal to or Greater than a Predetermined Number>

The imaging apparatus 100 records the number of files when still image files or moving image files are recorded on the recording medium 140 based on the DCF standard format. According to the DCF standard, the maximum number of files recordable in a single folder is limited to 9999. Therefore, as described in the present exemplary embodiment, when still image files are newly generated in a shooting operation, the still image files may not be record in a folder in which appending source moving image files are stored. In this case, relevant still image files may be stored in a folder different from the folder in which the appending source moving image files are stored. The visibility will be worsened when a user later browses the image files. Hence, in the above-described case, the control unit 101 records a moving image as a new file without appending any data and stores the file in a new folder. Although the maximum number of files recordable in a single folder is limited to 9999 in the above-described exemplary embodiment, the upper limit can be set to any other value (e.g., 999, 900, or 100) if desired.

<If No Coincidence is Recognized with Respect to Copyright Holder Information>

The imaging apparatus 100 enables a user to operate the operation unit 104 to store a copyright holder name or a creator name in a nonvolatile memory (not illustrated). Then, the copyright holder name or the creator name stored in the nonvolatile memory can be read out by the control unit 101 when a moving image file or a still image file is recorded on the recording medium 140 and can be stored as meta data in the moving image file or the still image file. More specifically, different copyright holder names or creator names may be stored as meta data in a plurality of moving image files or still image files stored on the recording medium 140. In the present exemplary embodiment, a copyright holder name or a creator name of the specific moving image file "MDG_000X.MOV", i.e., an appending target file recorded on the recording medium 140, does not coincide with a copyright holder name or a creator name stored in a nonvolatile memory through the presently performed recording, the appending operation is set to be unfeasible. The above-described operation is useful to prevent different copyright holder names or different creator names from being mixed in the same moving image file.

Further, in a case where the check is failed due to a damage having been occurred in the recording medium 140 or the existing moving image file, the appending operation is set to be unfeasible.

As described above, even when the imaging apparatus 100 according to the present exemplary embodiment connects moving image data using the compression method accompanied by the constraint that "the IDR frame identification ID (idr_pic_id) to be allocated to each of neighboring IDR frames must be different from each other", the imaging apparatus 100 can generate moving image data while fulfilling the constraint.

In the above-described exemplary embodiment, the imaging apparatus 100 performs recording by appending moving image data of the IDR frame stored in the RAM 102 to the existing moving image file recorded on the recording medium 140 in response to an input of the still image capturing instruction in the "movie digest mode."

However, the imaging apparatus 100 may be configured to perform recording by appending the moving image data of the IDR frame stored in the RAM 102 to the existing moving image file recorded on the recording medium 140 in response to an input of a moving image recording instruction instead of the still image capturing instruction. In this case, it is unnecessary to perform the still image capturing operation.

Further, the imaging apparatus 100 may be configured to continue the moving image shooting operation when the still image capturing instruction is input. In a case where the moving image shooting operation is not interrupted, the last frame number (in other words, the number of frames having been compression coded by the encoding and decoding processing unit 160) can be identified at the input timing of a moving image recording stop instruction.

Therefore, in response to an input of the moving image recording stop instruction, the CPU 101 calculates a "remainder" that can be obtained by dividing the number of frames having been compression coded by the encoding and decoding processing unit 160 by 256 and subtracts 1 from the obtained remainder. Then, the CPU 101 designates the acquired value as the IDR_ID relevant information E of the final frame.

Then, the CPU 101 controls the recording and reproduction unit 141 in such a way as to store the IDR_ID relevant information E of the final frame in the user data atom of the moon atom of the appended moving image file. Further, in a case where the input instruction is the moving image recording instruction, not the still image capturing instruction, it is useful to perform a similar operation instead of the still image capturing operation.

As described above, the present exemplary embodiment is applicable to an imaging apparatus. For example, the imaging apparatus is a general compact digital camera, a digital single-lens reflex camera, a video camera, or a portable telephone. Further, the apparatus to which the technique of the present invention is applicable is not limited to the imaging apparatus. For example, it is useful to apply the present invention to a personal computer connected to a camera.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-265065 filed Dec. 2, 2011, which is hereby incorporated by reference herein in its entirety.

What is claimed is:

1. An image processing apparatus comprising:
a compression unit configured to compress moving image data and assign identification information to each frame of the compressed moving image data;
a recording unit configured to record the moving image data compressed by the compression unit on a recording medium according to a recording instruction,
the recording unit appending the compressed moving image data to a moving image file which has been already recorded on the recording medium; and
a controller configured to determine a frame other than a specific frame of the moving image data compressed by the compression unit predetermined number of frames before the input timing of the recording instruction as an appending start frame and control the recording unit in such a way as to append the compressed moving image data of the appending start frame to the moving image file, if identification information of the specific frame coincides with identification information of a final frame of moving image data stored in the moving image file, and to determine the specific frame as the appending start frame and control the recording unit in such a way as to append the compressed moving image data of the appending start frame to the moving image file, if the identification information of the specific frame does not coincide with the identification information of the final frame of the moving image data stored in the moving image file.

2. The image processing apparatus according to claim 1, further comprising:
a memory unit configured to store information relating to the number of frames compressed by the compression unit,
wherein the controller is configured to calculate identification information of the frame compressed by the compression unit the predetermined number of frames before the input timing of the recording instruction, based on the information relating to the number of frames compressed by the compression unit.

3. The image processing apparatus according to claim 1, wherein the identification information of the final frame of moving image data stored in the moving image file is stored in a storage area of management information of the moving image file.

4. The image processing apparatus according to claim 1, wherein the controller is configured to determine a compressed frame that follows the specific frame as the appending start frame, if the identification information of the specific frame coincides with the identification information of the final frame.

5. The image processing apparatus according to claim 1, wherein the compression unit is configured to assign the same identification information to a plurality of frames of the compressed moving image data at predetermined intervals.

6. The image processing apparatus according to claim 1, wherein the compression unit is configured to compress the moving image data using intra-frame predictive encoding.

7. The image processing apparatus according to claim 1, wherein the identification information is identification information indicating an intra-frame predictive coded frame.

8. The image processing apparatus according to claim 1, wherein the compression unit is configured to compress the moving image data using an MPEG-4 AVC/H.264 format.

9. The image processing apparatus according to claim 1, wherein the identification information is IDR frame identification ID.

10. The image processing apparatus according to claim 1, wherein the identification information is idr_pic_id.

11. An image processing apparatus comprising:
a processing unit configured to output compressed moving image data, wherein identification information is assigned to each frame of the compressed moving image data;
a memory configured to be capable of storing at least predetermined number of frames of the compressed moving image data, wherein the processing unit successively writes the compressed moving image data into the memory;
a recording unit configured to record the compressed moving image data stored in the memory on a recording medium according to a recording instruction, the recording unit appending the compressed moving image data to a moving image file which has been already recorded on the recording medium;
a control unit configured to determine an appending start frame for appending the compressed moving image data to the moving image file and control the recording unit to append the compressed moving image data of the appending start frame to the moving image file,
wherein the control unit determines as the appending start frame a predetermined frame, of the compressed moving image data stored in the memory, the predetermined number of frames before the recording instruction if the identification information of a last frame of compressed moving image data stored in the moving image file does not coincides with the identification information of the predetermined frame, and determines as the appending start frame a frame other than the predetermined frame if the identification information of the last frame coincides with the identification information of the predetermined frame.

12. The image processing apparatus according to claim 11, wherein the recording unit records on the recording medium the compressed moving image data output from the processing unit before the recording instruction.

13. The image processing apparatus according to claim 11, wherein the identification information of different number is assigned to each of neighboring frames of the compressed moving image data.

14. The image processing apparatus according to claim 11, wherein each frame of the moving image data is compressed by using intra-frame predictive coding.

15. The image processing apparatus according to claim 11, further comprising:
an imaging unit, and
wherein the processing unit compresses moving image data obtained by the imaging unit and outputs the compressed moving image data.

16. The image processing apparatus according to claim 11, wherein the processing unit outputs audio data, and
wherein the recording unit records the audio data on the recording medium and appends the audio data to the moving image file.

17. An image processing method comprising:
compressing moving image data and assigning identification information to each frame of the compressed moving image data;
recording the compressed moving image data on a recording medium according to a recording instruction,
determining a frame other than a specific frame of the compressed moving image data predetermined number of frames before the input timing of the recording instruction as an appending start frame and appending the compressed moving image data of the appending start frame to a moving image file which has been already recorded on the recording medium, if identification information of the specific frame coincides with identification information of a final frame of moving image data stored in the moving image file; and
determining the specific frame as the appending start frame and appending the compressed moving image data of the appending start frame to the moving image file which has been already recorded on the recording medium, if the identification information of the specific frame does not coincide with the identification information of the final frame of the moving image data stored in the moving image file.

18. An image processing method comprising:
outputting compressed moving image data,
wherein identification information is assigned to each frame of the compressed moving image data,
writing successively the compressed moving image data into a memory capable of storing at least predetermined number of frames of the compressed moving image data;
recording the compressed moving image data stored in the memory on a recording medium according to a recording instruction;
determining as an appending start frame a predetermined frame, of the compressed moving image data stored in the memory, the predetermined number of frames before the recording instruction and appending the compressed moving image data of the appending start frame to a moving image file which has been already recorded on the recording medium if the identification information of a last frame of compressed moving image data stored in the moving image file does not coincides with the identification information of the predetermined frame; and
determining as the appending start frame a frame other than the predetermined frame and appending the compressed moving image data of the appending start frame to a moving image file which has been already recorded on the recording medium if the identification information of the last frame coincides with the identification information of the predetermined frame.

* * * * *